United States Patent
Stiefel et al.

(10) Patent No.: US 10,657,491 B2
(45) Date of Patent: *May 19, 2020

(54) MERCHANDISE EVENT MONITORING VIA WIRELESS TRACKING

(71) Applicant: Walmart Apollo, LLC, Bentonville, AR (US)

(72) Inventors: Thomas E. Stiefel, Bentonville, AR (US); Nicholaus Adam Jones, Fayetteville, AR (US); Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/885,992

(22) Filed: Feb. 1, 2018

(65) Prior Publication Data

US 2018/0253681 A1    Sep. 6, 2018

Related U.S. Application Data

(63) Continuation of application No. 15/096,928, filed on Apr. 12, 2016, now Pat. No. 9,916,556, which is a
(Continued)

(51) Int. Cl.
*G06Q 10/08* (2012.01)
*G06K 7/10* (2006.01)

(52) U.S. Cl.
CPC ....... *G06Q 10/087* (2013.01); *G06K 7/10366* (2013.01); *G06K 7/10475* (2013.01); *G06Q 10/08* (2013.01)

(58) Field of Classification Search
CPC ................... G06F 19/00; G06K 7/10
(Continued)

(56) References Cited

U.S. PATENT DOCUMENTS 6,270,433 B1    8/2001    Orenstein et al.
6,424,264 B1    7/2002    Giraldin et al.
(Continued)

OTHER PUBLICATIONS

International Search Report and Written Opinion for International Application No. PCT/US14/23510 dated Jul. 14, 2014.
(Continued)

*Primary Examiner* — Nam V Nguyen
(74) *Attorney, Agent, or Firm* — McCarter & English, LLP; David R. Burns

(57) ABSTRACT

Item movement is determined via wireless tracking using RFID data from at least one RFID reader. The RFID data associates RFID tag information with each antenna of the RFID reader that receives the tag information. At least one processor is configured to identify a first appearance of unique tag information in the RFID data. Items may be grouped when their first appearance in RFID data and their antenna association indicates that they first appear in a location within a predetermined amount of time, as indicated by RFID data, and/or when they have all moved from a previous location within a predetermined amount of time, as indicated by different RFID data. A group designation comprises the relevant unique tag information, which may be stored in memory along with a time stamp.

18 Claims, 7 Drawing Sheets

Related U.S. Application Data continuation of application No. 13/862,354, filed on Apr. 12, 2013, now Pat. No. 9,443,218.

(60) Provisional application No. 61/788,846, filed on Mar. 15, 2013.

(58) Field of Classification Search
USPC .......... 340/10.1–10.5, 572.1, 5.92; 235/385, 235/375, 383; 700/236; 705/22, 28
See application file for complete search history.

(56) References Cited

U.S. PATENT DOCUMENTS

| | | |
|---|---|---|
| 6,903,656 B1 | 6/2005 | Lee |
| 6,924,741 B2 | 8/2005 | Tamayama et al. |
| 7,005,968 B1 | 2/2006 | Bridgelall |
| 7,019,642 B2 | 3/2006 | Nelson et al. |
| 7,119,687 B2 | 10/2006 | Paulsen et al. |
| 7,242,306 B2 | 7/2007 | Wildman et al. |
| 7,246,746 B2 | 7/2007 | McNamara et al. |
| 7,298,264 B1 | 11/2007 | Kuzma et al. |
| 7,540,419 B2 | 6/2009 | Amitay et al. |
| 7,602,288 B2 | 10/2009 | Broussard |
| 7,667,572 B2 | 2/2010 | Husak et al. |
| 7,688,349 B2 * | 3/2010 | Flickner ............. G06K 9/00362 348/150 |
| 7,741,967 B2 | 6/2010 | Valeriano et al. |
| 7,973,641 B1 | 7/2011 | Huang |
| 8,514,081 B2 * | 8/2013 | Cristache ............. G01S 13/876 340/572.1 |
| 8,519,848 B2 | 8/2013 | Stern |
| 8,884,741 B2 | 11/2014 | Cavallaro et al. |
| 9,625,321 B2 | 4/2017 | Cavallaro et al. |
| 9,916,556 B2 | 3/2018 | Stiefel et al. |
| 2003/0216969 A1 | 11/2003 | Bauer et al. |
| 2005/0049914 A1 | 3/2005 | Parish |
| 2005/0246248 A1 | 11/2005 | Vesuna |
| 2006/0092040 A1 | 5/2006 | Fishkin et al. |
| 2006/0192003 A1 | 8/2006 | Chung |
| 2006/0232382 A1 | 10/2006 | Bauer et al. |
| 2006/0267733 A1 | 11/2006 | Steinke et al. |
| 2007/0126716 A1 | 6/2007 | Haverly |
| 2008/0001748 A1 | 1/2008 | Childress et al. |
| 2008/0061967 A1 | 3/2008 | Corrado |
| 2008/0079540 A1 | 4/2008 | Aull et al. |
| 2008/0316029 A1 | 12/2008 | Hannah et al. |
| 2009/0201169 A1 | 8/2009 | d'Hont et al. |
| 2009/0219170 A1 | 9/2009 | Clark et al. |
| 2009/0231135 A1 | 9/2009 | Chaves et al. |
| 2010/0019035 A1 | 1/2010 | Larson et al. |
| 2010/0237994 A1 | 9/2010 | Carraher et al. |
| 2011/0227704 A1 | 9/2011 | Padmanabhan et al. |
| 2011/0309931 A1 | 12/2011 | Rose |
| 2012/0025973 A1 | 2/2012 | Derks et al. |
| 2012/0086553 A1 | 4/2012 | Wilkinson et al. |
| 2012/0086554 A1 | 4/2012 | Wilkinson et al. |
| 2012/0092134 A1 | 4/2012 | Stern et al. |
| 2012/0161967 A1 | 6/2012 | Stern |
| 2012/0235817 A1 | 9/2012 | Forster |
| 2013/0002879 A1 | 1/2013 | Weber |
| 2013/0049925 A1 | 2/2013 | Subramanian |
| 2014/0159872 A1 | 6/2014 | Bekritsky et al. |
| 2014/0263635 A1 | 9/2014 | Jones et al. |
| 2014/0263636 A1 | 9/2014 | Jones et al. |
| 2014/0266621 A1 | 9/2014 | Jones et al. |
| 2014/0306804 A1 | 10/2014 | Stiefel et al. |

OTHER PUBLICATIONS

International Search Report and Written Opinion issued in International Patent Application No. PCT/US2014/024890, dated Jul. 17, 2014.

International Search Report and Written Opinion issued in International Application No. PCT/US2014/026698, dated Oct. 2, 2014.

U.S. Appl. No. 13/862,354, filed Apr. 12, 2013, Thomas E. Stiefel et al.

U.S. Appl. No. 15/096,928, filed Apr. 12, 2016, Thomas E. Stiefel et al.

U.S. Appl. No. 13/862,354, filed Apr. 12, 2013, U.S. Pat. No. 9,443,218, Issued.

U.S. Appl. No. 15/096,928, filed Apr. 12, 2016, U.S. Pat. No. 9,916,556, Issued.

\* cited by examiner

MERCHANDISE EVENT MONITORING VIA WIRELESS TRACKING

RELATED APPLICATIONS

This application is a continuation of U.S. patent application Ser. No. 15/096,928, filed Apr. 12, 2016, now U.S. Pat. No. 9,916,556, which is a continuation of U.S. Pat. No. 9,443,218, filed on Apr. 12, 2013, which claims priority under 35 U.S.C. § 119(e) to U.S. Provisional Patent Application Ser. No. 61/788,846, entitled "Merchandise Event Monitoring Via Wireless Tracking," filed on Mar. 15, 2013, the entire contents of each application are incorporated herein by reference.

FIELD OF INVENTION

Embodiments relate generally to radio frequency identification and the use of RFID tag information.

DESCRIPTION OF RELATED ART

RFID is a wireless, non-contact system that uses radio-frequency electromagnetic fields to transfer data from a tag attached to an object for automatic identification and tracking. A conventional RFID system includes one or more RFID tags and an RFID reader. The RFID tag includes a transponder having a radio frequency integrated circuit and an antenna. The RFID reader includes an antenna and a transceiver. The transceiver includes a transmitter, a receiver and a decoder for processing data within the signal emitted by the RFID tag. When a RFID tag is within the activation range of the RFID reader, the RFID reader can read tag information transmitted by the RFID tag.

In former approaches, a plurality of RFID readers may have been used together to comprise an RFID reader system. RFID readers have been dispersed throughout a facility to enable the RFID readers to read the majority of RFID tags within the facility. Multiple RFID readers have been used within a facility for purposes of tracking individual RFID tagged items. RFID information has been used with respect to inventory detection. RFID information has also been used to alert personnel of any RFID tagged item passing through a threshold, such as a customer door for a store.

SUMMARY

The inventors of the present invention recognized that the historical focus on monitoring individual RFID tags may not reveal information that can be determined by looking at similarities that can be discovered by monitoring pluralities of RFID tags. The inventors of the present invention recognized grouping multiple RFID tags over time may provide insights into various events that are not discernible when focused on monitoring individual RFID tag. The prior RFID data analysis methods have limited application to rapid event detection. To streamline the event determination process and adapt an analysis and notification system, the inventors recognized a need to quickly and automatically monitor movement of groups of RFID tags within a facility. Various embodiments, computer-implemented methods and systems are directed to monitoring merchandise events via wireless tracking.

In one aspect, embodiments of the invention are directed to a method of monitoring a group of merchandise event via wireless tracking. The method includes receiving first RFID data from a first RFID reader and receiving second RFID data from a second RFID reader. The first RFID data associates tag information of an RFID tag with at least one first antenna of the first RFID reader that read the tag information. The second RFID data associates tag information of an RFID tag with at least one second antenna of the second RFID reader that read the tag information. A processor identifies a first appearance of first unique tag information in the first RFID data. The processor also identifies an appearance of the first unique tag information in the second RFID data. If the appearance of the first unique tag information in the second RFID data occurs prior to its first appearance in the first RFID data, then the processor may determine that the RFID tag with the first unique tag information has moved from a location where it can be read by the second RFID reader to a location where it can be read by the first RFID reader. The processor also identifies the first appearance of second unique tag information in the first RFID data within a predetermined time of the first appearance of the first unique tag information in the first RFID data. Upon finding two first appearances of unique tag information in the first RFID data within a predetermined time, the processor checks for an appearance of the second unique tag information where the first unique tag information previously appeared. In particular, the processor checks for an appearance of the second unique tag information in the second RFID data prior to the first appearance of the second unique tag information in the first RFID data. If the processor finds the appearance of the second unique tag information in the second RFID data prior to the first appearance of the second unique tag information in the first RFID data, then the processor may determine that the RFID tag with the second unique tag information has similarly moved from a location where it can be read by the second RFID reader to a location where it can be read by the first RFID reader. Accordingly, the processor designates a first group comprising the first unique tag information and the second unique tag information. Then the processor stores in memory the first group designation, a first time index, and a first event indicator, wherein the first event indicator indicates a group formation.

Embodiments of the invention may terminate a designated group based on different circumstances. For example, in one embodiment of the invention, a group may be terminated if the RFID data indicates no change in the location of any group member for a second predetermined time. In another embodiment of the invention, a group may terminated if the RFID data indicates that one member of the group is no longer located with the other members for a second predetermined time. In another embodiment of the invention, a group may be terminated if the RFID data indicates that members of the group have been moved to distinct locations for a second predetermined time. Generally, group termination involves storing in memory the group designation, a time index, and an event indicator indicating group termination.

In some embodiments, the method may further include checking the first RFID data for appearances of the first unique tag information and the second unique tag information. If the first RFID data continues to include appearances of both the first unique tag information and the second unique tag information for a second predetermined time, then the first group designation, a second time index, and a second event indicator that indicates the termination of a group designation are stored in memory.

In some embodiments, the method may further include checking the first RFID data for appearances of the first unique tag information and the second unique tag information. If the first RFID data comprises no appearance of either the first unique tag information or the second unique tag information for a second predetermined time limit, then the first group designation, a second time index, and a second event indication that indicates the termination of a group designation are stored in memory.

In some embodiments, the method may further include identifying a first appearance of first unique tag information in third RFID data and identifying a first appearance of second unique tag information in fourth RFID data. The method then includes checking for an appearance of the first unique tag information in the fourth RFID data. The method may further include checking for an appearance of the second unique tag information in the third RFID data. If the third RFID data includes no appearance of the second unique tag information and the fourth RFID data includes no appearance of the first unique tag information for a second predetermined time limit, the third RFID data and fourth RFID data indicates that the RFID tags in the first group have been separated. Accordingly, the first group comprising the first unique tag information and the second unique tag information is terminated. Then the first group designation, a second event indicator, and a second time index that indicates a group termination are stored in memory.

In some embodiments, the foregoing method may further include receiving third RFID data from a third RFID reader. The third RFID reader comprises at least one antenna configured to read tag information of an RFID tag. The first RFID data associates tag information of an RFID tag with the at least one antenna that reads the tag information. The processor identifies a first appearance of first unique tag information and second unique tag information in the third RFID data within a predetermined time. The first appearances of the first unique tag information and second unique tag information in the third RFID data may also be required to occur within another predetermined time of an appearance of the first unique tag information and/or the second unique tag information in the first RFID data. If the first and second unique tag information have been previously designated a group, and the RFID data available to the processor indicates that their unique tag information was read by one antenna, but is now read by another antenna with a non-overlapping read zone—the new first appearances may indicate a group move. For example, when the at least one antenna of the third RFID reader and the at least one antenna of the first RFID reader have non-overlapping read zone, the first new appearances of the first and second unique tag information in the third RFID data may indicate a group move. Under the right circumstances, the first new appearances with cause the processor to determine that the group has moved. Accordingly, the first group designation, a second time index, and a second event indicator that indicates a group movement will be stored in memory.

In some embodiments, the method may include calculating by at least one processor a confidence score based on a comparison of the appearance of the tag information in the first RFID data and the second RFID data.

In some embodiments, the method may include triggering an alert based on the second event indicator. The alert may be in the form of a system notification, a message directed towards a specific user, a message sent via visual or audio alters throughout the facility. In some embodiments, the method may include triggering by the processor an alert based on the second event indicator and the tag information of the first RFID tag and the second RFID tag. In some embodiments, the method may include transmitting the alert to an inventory management system. The message sent to the inventory management system may include a status update by the system or may include a request for an action by the inventory management system. The request may be a restocking or a reordering request. The request may be intended to trigger a system or a human reaction. In some embodiments, the method may include analyzing by the processor, a plurality of second event indicators to identify a traffic flow pattern within a facility. The traffic flow pattern may include how people move about the facility, how much time is spent in a particular area of the facility, or quantity of items originating from areas of the facility. In some embodiments, the method may include filtering by the processor, the first RFID data to eliminate shadow data. Shadow data include duplicate RFID tag reads or RFID tag reads that are ambiguous due to signal interruptions.

In another aspect, embodiments of the present invention are directed to a system for determining item movement via wireless tracking. The system comprises a first RFID reader, a second RFID reader, at least one processor, and a memory coupled to the at least one processor. The first RFID reader has at least one first antenna configured for read RFID tag information. The first RFID data associates tag information from an RFID tag with each of the at least one first antenna that reads the tag information. The second RFID reader has at least one second antenna configured to read RFID tag information. The second RFID data associates tag information of an RFID tag with each of the at least one second antenna that reads the tag information. The at least one processor is configured to identify a first appearance of unique tag information in the different RFID data. After the at least one processor identifies a first appearance of first unique tag information in the first RFID data, it looks for a prior appearance of the first unique tag information in other RFID data. If the at least one processor identifies a first appearance of second unique tag information in the first RFID data within a predetermined time of the first appearance of the first unique tag information in the first RFID data, it looks for a prior appearance of the second unique tag information in whatever other RFID data the first unique tag information previously appeared. Accordingly, the at least one processor may determine a movement of two RFID tags together from a location where they can be read by the second RFID reader to a location where they can be read by the first RFID reader. If the appearance of the second unique tag information in the second RFID data prior to the first appearance of the second unique tag information in the first RFID data is found, the at least one processor designates a first group comprising the first unique tag information and the second unique tag information. Accordingly, the memory stores a first group designation, a first time index, and a first event indicator that indicates a group formation.

In some embodiments of the system, the at least one processor is further configured to compare associations of tag information in the first RFID data. The memory is operatively coupled to at least one processor. When the first RFID data associations of tag information of the first RFID tag and the second RFID tag do not change within a second predetermined time limit, the first group designation, a second time index, and a second event indicator that indicates the termination of a group designation may be stored in memory.

In some embodiments of the system, the at least one processor is further configured to check the first RFID data for tag information of the first RFID tag and the second RFID tag. The memory is operatively coupled to at least one processor. When the first RFID data does not include tag information of the first RFID tag or the second RFID tag for a third predetermined time limit, the first group designation, a second time index, and a second event indicator that indicates the termination of a group designation may be stored in memory.

In some embodiments of the system, the at least one processor is further configured to receive a third RFID data from a third RFID reader comprising at least one third antenna. The first RFID data associates tag information of an RFID tag with at least one third antenna that read the tag information. The at least one processor is further configured to identify a first appearance of first unique tag information and a first appearance of second unique tag information in the third RFID data. The at least one processor is further configured to check whether the two first appearances in the third RFID data occurred within a second predetermined time and whether the first appearances in the third RFID data occurred within a third predetermined time of an appearance of the first unique tag information or the second unique tag information in the first RFID data. If the first appearances occur within the second period of time and the third period of time, the at least one processor is further configured to cause the first group designation, a second time index, and a second event indicator that indicates a group movement to be stored in memory.

In some embodiments of the system, the at least one processor is further configured to calculate a confidence score based on a comparison of the appearance of the tag information in the first RFID data and the second RFID data.

In some embodiments of the system, the at least one processor is further configured to trigger an alert based on the second event indicator. In some embodiments, the system may further include the processor further configured to trigger an alert based on the second event indicator and the tag information of the first RFID tag, and the second RFID tag. In some embodiments, the system may further include the processor configured to transmit the alert to an inventory management system. In some embodiments, the system may further include the processor further configured to analyze, a plurality of the second event indicators to identify a traffic flow pattern within a facility. In some embodiments, the system may further include the processor further configured to filter the first RFID data to eliminate shadow data.

In another aspect, embodiments of the invention are directed to a method of monitoring a group merchandise event via wireless tracking. The method includes receiving first RFID data from a first RFID reader comprising a plurality of antennas. The plurality of antennas comprises a first antenna and a second antenna having non-overlapping read zones. The first RFID data associates tag information of an RFID tag with each of the plurality of antennas that read the tag information. The method involves identifying, by a processor, a first appearance of first unique tag information in the first RFID data associated with the first antenna. The method also involves identifying, by a processor, an appearance of first unique tag information in the first RFID data associated with the second antenna prior to the first appearance of the first unique tag information in the first RFID data associated with the first antenna. The method further involves identifying, by the processor, a first appearance of second unique tag information in the first RFID data associated with the first antenna within a predetermined time of the first appearance of the first unique tag information in the first RFID data associated with the first antenna. The method involves checking, by the processor, for an appearance of the second unique tag information in the first RFID data associated with the second antenna prior to the first appearance of the second unique tag information in the first RFID data associated with the first antenna. If the appearance of the second unique tag information in the first RFID data associated with the second antenna prior to the first appearance of the second unique tag information in the first RFID data associated with the first antenna is found, the method involves designating, by the processor, a first group comprising the first unique tag information and the second unique tag information and storing in memory the first group designation, a first time index, and a first event indicator indicating a group formation.

In some embodiments, the method may include checking, by the processor, the first RFID data for tag information of the first RFID tag and the second RFID tag. The first group designation, a second time index, and a second event indicator when the first RFID data does not include tag information of the first RFID tag or the second RFID tag, for a third predetermined time limit, wherein the second event indicator indicates the termination of a group designation may be stored in memory.

Any combination of the embodiments is envisioned. Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of the invention use RFID data from at least two non-overlapping read zones to identify RFID tags that have moved together from a first read zone to a second non-overlapping read zone. Each RFID tag makes unique tag identification information available. RFID data is generated by at least one RFID reader having at least one antenna configured to read RFID tag information. Whereas some embodiments may use RFID data from a single RFID reader having at least two antennas with non-overlapping read zones, other embodiments use RFID data from multiple RFID readers. When an RFID reader features a plurality of antennas, the RFID reader associates the tag information with each antenna that read the tag information. Thus, the RFID data associates tag information with each antenna that reads the tag information.

A processor in accordance with embodiments of the invention identifies appearances of tag information in different read zones based on RFID data. Generally, the processor starts by identifying a first appearance of first unique tag information in a new read zone from RFID data. The processor then identifies a prior appearance of the first unique tag information at a former read zone. Thus, movement of the first unique tag from the former read zone to the new read zone can be inferred from the RFID data. Next, the processor identifies a first appearance of second unique tag information in the new read zone from RFID data. If the first appearance of the second unique information in the new read zone occurs within a predetermined time of the first appearance of the first unique tag information, the processor checks whether the second unique tag information has previously appeared in the former read zone of the first unique tag, as indicated by the RFID data. If so, movement of the first and second unique tags together from the former read zone to the new read zone can be inferred from the RFID data. When two unique tags are determined to have moved together from a first read zone to a second read zone, a group comprising the tags is designated. Additionally, the group designation, a time stamp, and a group formation indicator are stored in memory.

The group designation is useful for automatic tracking a group as it may form, move, and uniform within a facility. Monitoring a single RFID tag may produce unreliable data and may not indicate events related to a plurality of RFID tags. The inventors recognized that monitoring groups of RFID tags via wireless tracking enables data association and analysis that may not be feasible with only information related to singe RFID tags. Accordingly, group designation and tracking may enable event monitoring such as the order of customer product selections, the timing of customer product selections, the movement of customer product selections, potential theft events, the need for restocking, etc.

Figure 1:
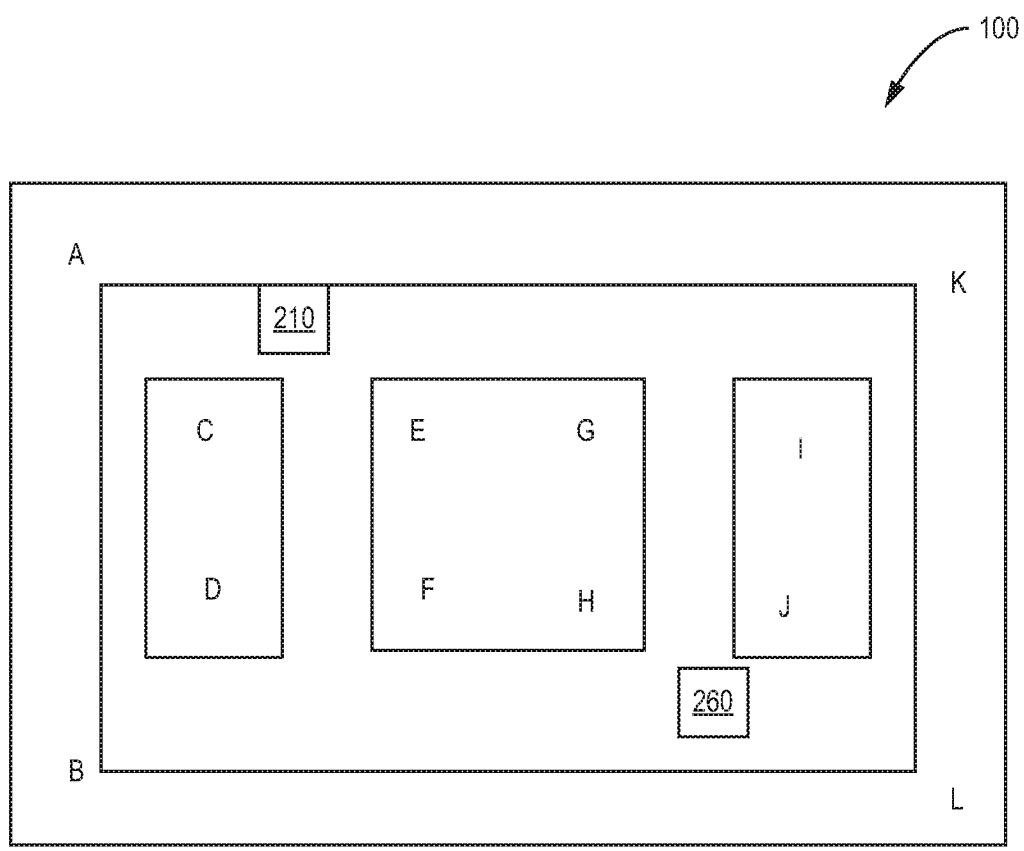
FIG. 1 depicts a plan view of an example of a retail store facility for illustrating certain aspects of some embodiments described herein.

FIG. 1 illustrates a plan view of an exemplary facility 100 having various zones A-L. For example, the facility may be a retail store having departments A-L. One of ordinary skill will understand that facility 100 is not limited to a particular number of zones. Items featuring RFID tags may be located in various zones of facility 100. For example, RFID tagged merchandise may be stocked at departments A-L of store 100. RFID tags can contain unique tag information and can be a fixed to individual items, to cases of items, to pallets, and/or to fixtures. An RFID tag for an individual item may contain unique tag information. One of ordinary skill will understand that facility 100 may include any number of RFID tagged items.

Different types of items may be located in different zones of facility 100. For example, men's clothing may be stocked in the men's clothing department A, and women's clothing may be stocked in the women's clothing department B. Certain products may be stocked in more than one location (e.g., departments A and F), or temporarily moved to a different location, such as an aisle end caps during a promotional event. Neither the RFID tag nor its tag information changes as the associated item's location changes within the facility.

FIG. 1 further illustrates two RFID readers in the exemplary facility. In FIG. 1, a first RFID reader 210 and a second RFID reader 260 are configured to read RFID tags. In some embodiments of the invention, three or more RFID readers may be configured to read RFID tags. One of skill in the art will recognize additional RFID readers could be used. The RFID readers may be distributed evenly or unevenly throughout the facility. The RFID readers may be arranged to segment or delineate the facility into particular zones. The RFID readers may be clustered in particular areas of the facility. For example, a plurality of RFID readers may be arranged in a fifty by fifty foot grid pattern. The RFID readers may be arranged in an overhead position. The RFID readers may be configured to attach to the ceiling or the roof of the facility or may be mounted to a support structure.

Figure 2A:
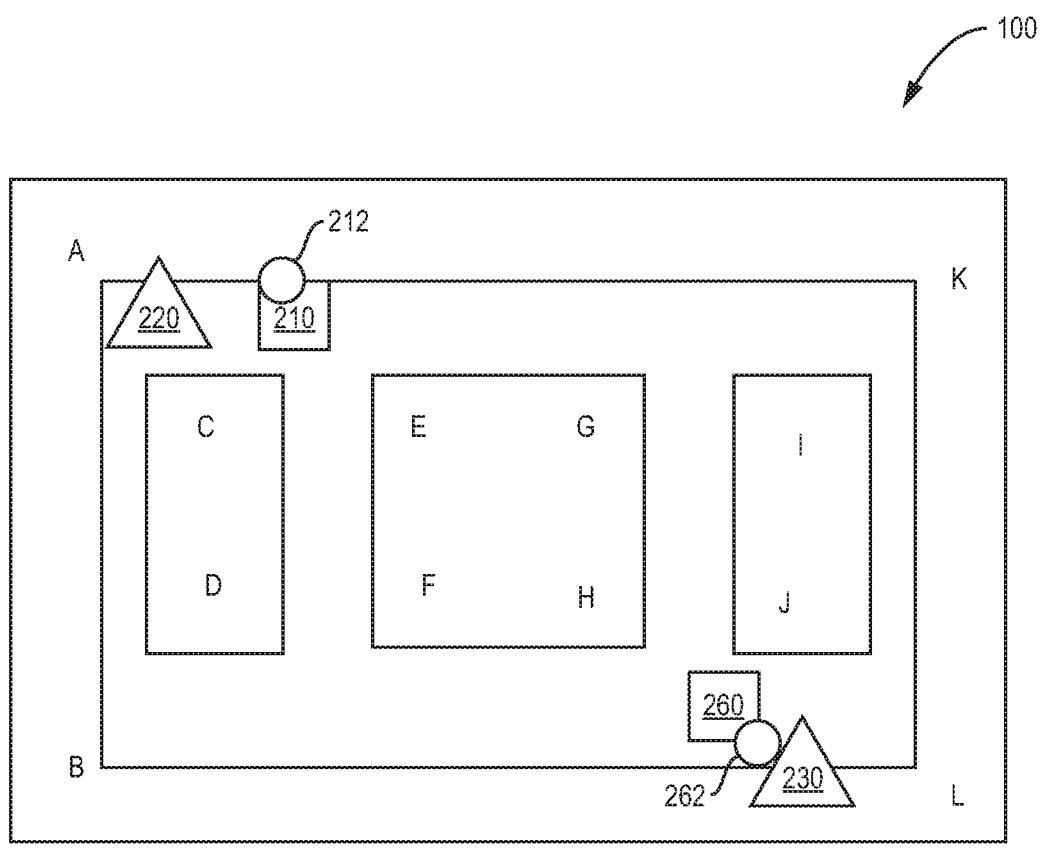
FIGS. 2A and 2B are diagrams illustrating exemplary arrangements of RFID readers in a facility consistent with embodiments.
Figure 2B:
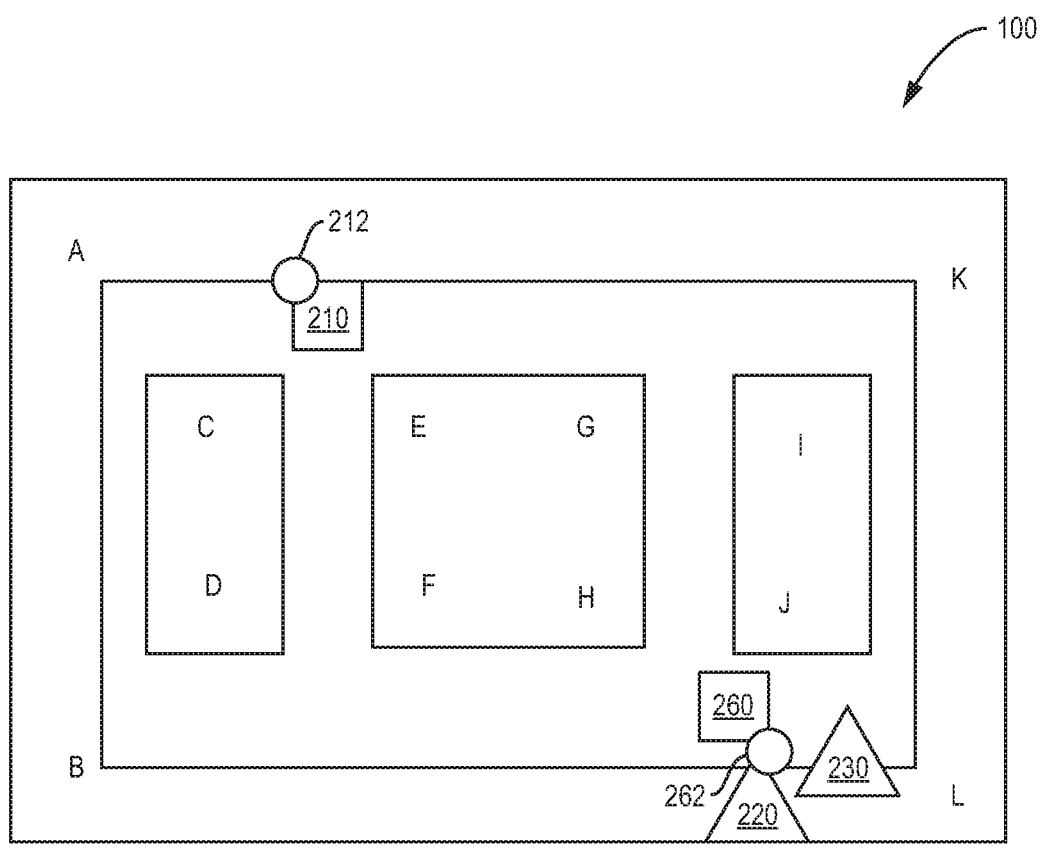

Similar to FIG. 1, FIGS. 2A and 2B each illustrate the plan view of exemplary facility 100 having various zones A-L and RFID readers 210 and 260. In FIGS. 2A and 2B, RFID reader 210 features an antenna 212 configured to read RFID tags. In FIGS. 2A and 2B, RFID reader 260 similarly features an antenna 262 configured to read RFID tags. One of skill in the art will recognize that RFID readers 210 and 260 could each individually feature one or more additional antennas. The RFID reader may be any suitable RFID reader, such as a UHF EPC Global Class 1 RFID reader, an Impinj Speedway Revolution RFID reader, a Motorola FX9500 RFID reader, or an Alien 9900 RFID reader. In facility 200, the RFID readers 210 and 260 may be the same type or different types.

The area within which an RFID reader antenna can read RFID tags is generally considered its read zone. When antennas can read the same RFID tag, they are deemed to have overlapping read zones. For example, two directional antennas in close proximity but oriented in opposite directions may not have overlapping read zones. On the other hand, when oriented in the same direction, the same two directional antennas may have overlapping read zones.

The RFID readers may be configured to have antennas arranged in 360 degree around the RFID reader or in any subset of the 360 degree arrangement. The RFID antennas may be positioned in a circular, rectangular, trapezoidal, hexagonal, pentagonal, square, triangular or diamond in arrangement. The RFID antennas may be phased array antennas. The RFID readers may have antennas of varying signal strength. The RFID readers may have a varying number of antennas. The RFID readers used in the system may have varying signal strength and reader sensitivity levels.

In FIGS. 2A and 2B, the antennas of RFID readers 210 and 260 are selected and positioned within the facility 100 such that they do not have with overlapping read zones. For example, antenna 212 and antenna 262 may be directional and may each be oriented such that their read zones do not overlap.

FIG. 2A illustrates a first location of RFID tag 220 and of RFID tag 230 in facility 100. The antenna of RFID reader 210 is selected and configured such that it is able to read RFID tag 220, but cannot read RFID tag 230, due to their respective locations in facility 100. Accordingly, RFID reader 210 will read RFID tag 220 and produce RFID data associating tag information from RFID tag 220 with antenna 212. The RFID data produced by RFID reader 210 may be designated first RFID data. The antenna of RFID reader 260 is selected and configured such that it is able to read RFID tag 230, but cannot read RFID tag 220, due to their respective locations in facility 100. Accordingly, RFID reader 260 will read RFID tag 230 and produce RFID data associating tag information from RFID tag 230 with antenna 262. The RFID data produced by RFID reader 260 may be designated second RFID data.

FIG. 2B illustrates a second location of RFID tag 220 and of RFID tag 230 in facility 100. The antenna of RFID reader 210 is selected and configured such that it cannot read RFID tags 220 or 230, due to their locations in facility 100. Accordingly, RFID reader 210 will not read RFID tag 220 nor produce first RFID data associating tag information from RFID tag 220 with antenna 212. The antenna of RFID reader 260 is selected and configured such that it is able to read RFID tags 230 and 220, due to their respective locations in facility 100. Accordingly, RFID reader 260 will read RFID tags 230 and 220 and produce second RFID data associating tag information from RFID tags 230 and 220 with antenna 262.

In accordance with embodiments of the invention, RFID data from RFID Readers 210 and 260 enables a group comprising RFID tag 220 and RFID tag 230 to be designated under the right circumstances. A group may be designated if at least two items are identified as having moved from a first read zone to a second non-overlapping read zone within a predetermined period of time. In accordance with embodiments of the invention, a processor in computing device 300 of FIG. 3 may process the RFID data from RFID readers 210 and 260 to identify appearances of unique tag information at particular times in particular zones. A processor in computing device 300 of FIG. 3 may process the RFID data from one or more additional or alternative RFID readers to identify appearances of unique tag information at particular times in particular zones. Similarly, memory 306 of FIG. 3 may store RFID data, appearance information derived from RFID data, group designations, time indexes, and/or event indicators. Additionally or alternatively, storage 324 of FIG. 3 may store RFID data, appearance information derived from RFID data, group designations, time indexes, and/or event indicators.

Those of skill in the art would recognize that RFID reader antennas need not have a directional read zone, need not have a conical read zone, need not be arranged as described in the foregoing example, and need not be equally spaced from other antennas. For example, each antenna of an RFID reader may be pointed in the same direction. Alternatively, antennas of an RFID reader may be arranged in 360 configuration about the RFID reader. Alternate antennas and antenna configurations are possible and within the scope of the invention.

One or more additional RFID data may be analyzed by the processor. At least one additional RFID tags may be included in the first or second RFID data. If an appearance of an additional RFID tag is present in the first or the second RFID data the processor may the third unique tag information in the identification and checking for tag information.

The processor 302 may determine if the read zones of two RFID reader antennas overlap. For example, if antenna 212 of RFID reader 210 and antennas 262 of RFID reader 260 read tag information from the same RFID tags frequently, antennas 212 and 262 may be deemed to have overlapping read zones. Alternatively, if antenna 212 of RFID reader 210 and antennas 262 of RFID reader 260 read the tag information of the same RFID tags only rarely, antennas 212 and 262 may be deemed to have non-overlapping read zones. The RFID data generated by RFID reader 210 and RFID reader 260, including any antenna associations and time information therein, may be used to identify overlap in antenna read zones. The processor 302 may generally designate a group comprising tag information of RFID tags that RFID data indicates have moved together from a first read zone to a second non-overlapping read zone. Moving together may be measured by various time periods. The processor 302 may perform further analyze RFID data to determine whether a designated group has moved, has increased in the number of RFID tags, has decreased in the number of RFID tags, or should be terminated.

Figure 3:
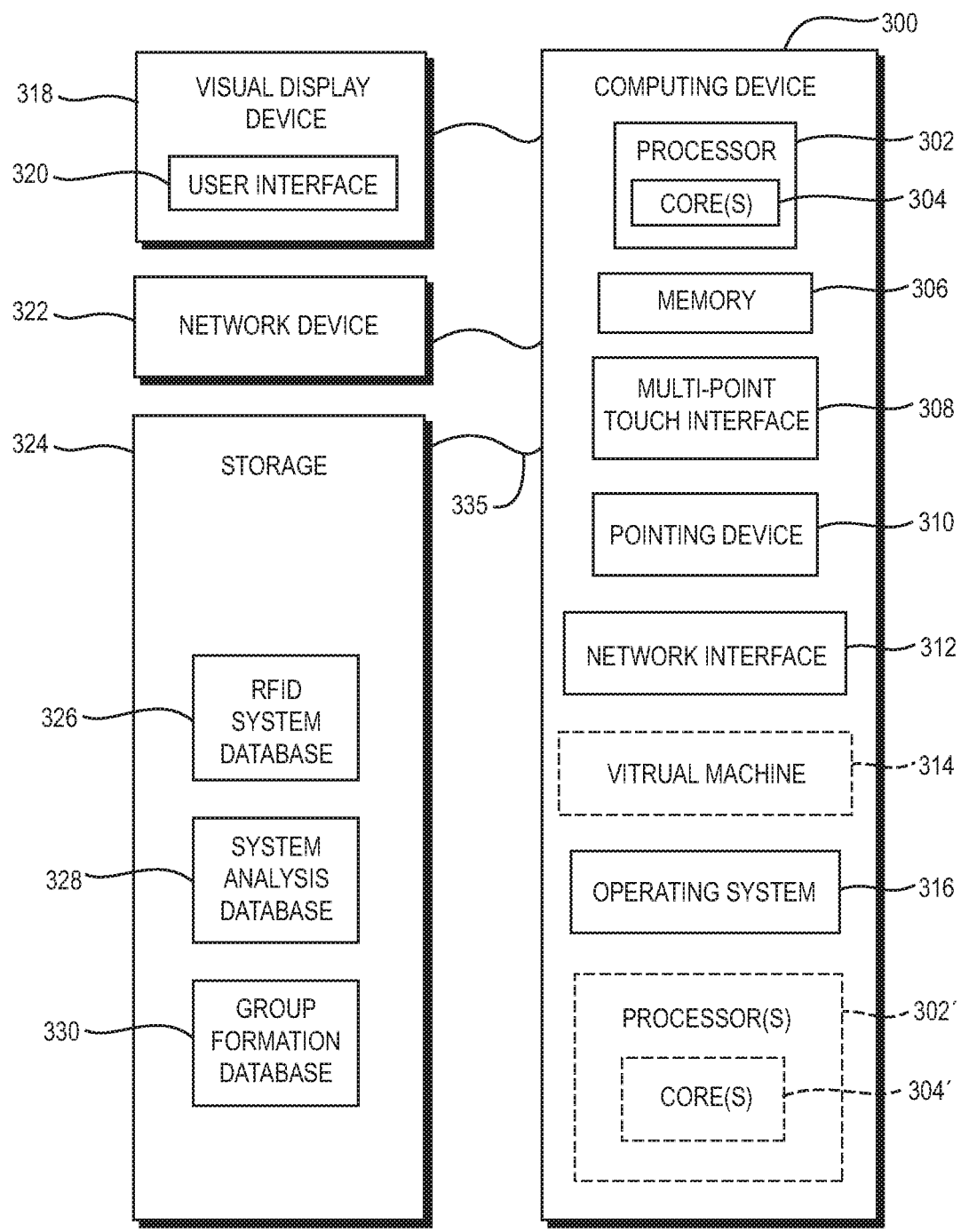
FIG. 3 is a block diagram of an exemplary computing device that may be used to perform any of the methods in the exemplary embodiments.

FIG. 3 is a block diagram of an exemplary computing device 300 that may be used to perform any of the methods provided by exemplary embodiments. The computing device 300 may be any suitable computing or communication device or system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 300 includes one or more non-transitory computer-readable media for storing one or more computer-executable instructions, programs or software for implementing exemplary embodiments. The non-transitory computer-readable media may include, but are not limited to, one or more types of hardware memory, non-transitory tangible media (for example, one or more magnetic storage disks, one or more optical disks, one or more USB flash-drives), and the like. For example, memory 306 included in the computing device 300 may store computer-readable and computer-executable instructions, programs or software for implementing exemplary embodiments. Memory 306 may include a computer system memory or random access memory, such as DRAM, SRAM, EDO RAM, and the like. Memory 306 may include other types of memory as well, or combinations thereof.

The computing device 300 also includes processor 302 and associated core 304, and optionally, one or more additional processor(s) 302' and associated core(s) 304' (for example, in the case of computer systems having multiple processors/cores), for executing computer-readable and computer-executable instructions or software stored in the memory 306 and other programs for controlling system hardware. Processor 302 and processor(s) 302' may each be a single core processor or multiple core (304 and 304') processor.

Virtualization may be employed in the computing device 300 so that infrastructure and resources in the computing device may be shared dynamically. A virtual machine 314 may be provided to handle a process running on multiple processors so that the process appears to be using only one computing resource rather than multiple computing resources. Multiple virtual machines may also be used with one processor.

Figure 4:
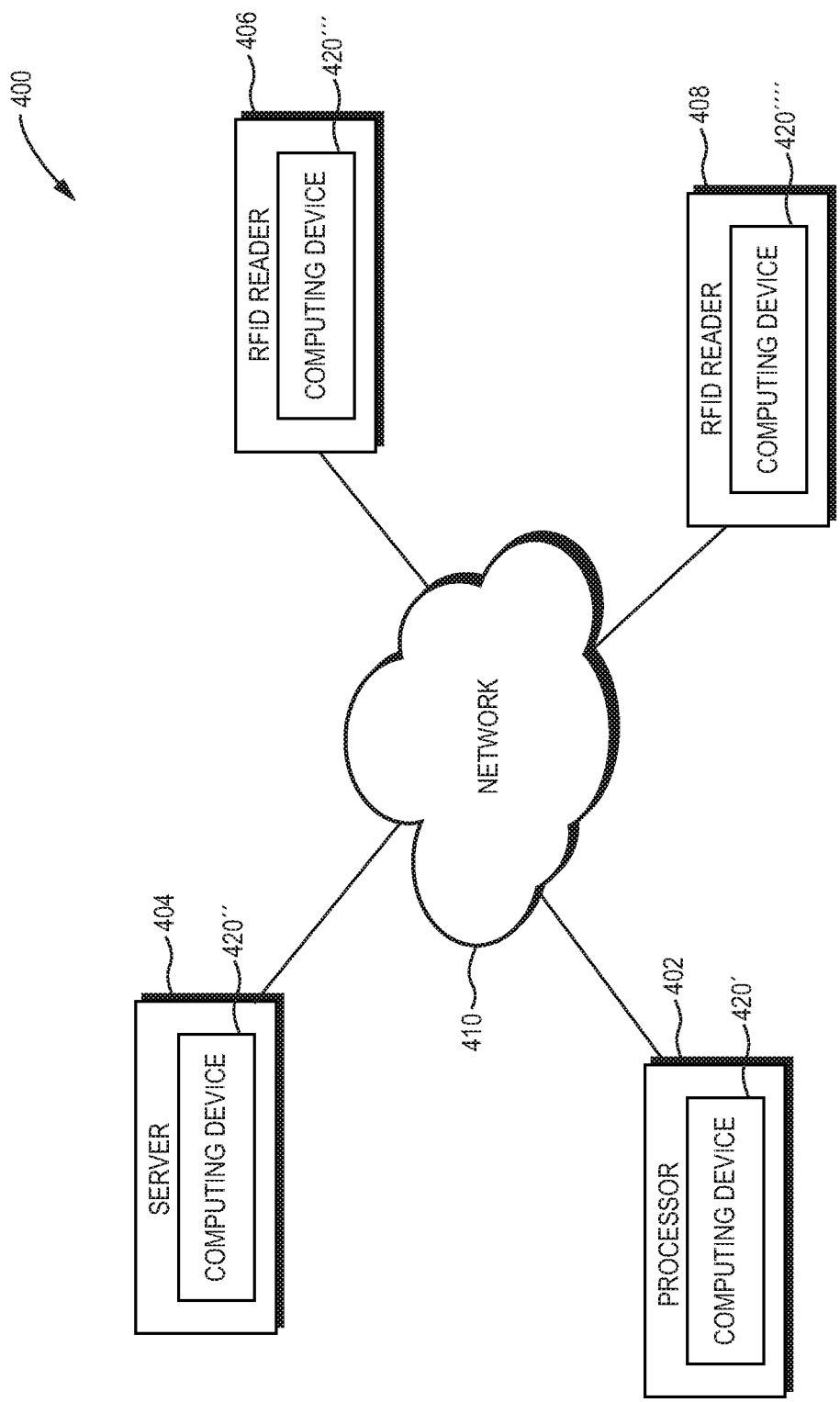
FIG. 4 is a block diagram of an exemplary network environment suitable for a distributed implementation of exemplary embodiments.

A user may interact with the computing device 300 through a visual display device 318, such as a computer monitor, which may display one or more user interfaces 320 that may be provided in accordance with exemplary embodiments, for example, the exemplary interfaces illustrated in FIG. 4. The visual display device 318 may also display other aspects, elements and/or information or data associated with exemplary embodiments, for example, views of location of the RFID readers, the internal boundaries of the facility, and the like. The computing device 300 may include other input/output (I/O) devices for receiving input from a user, for example, a keyboard or any suitable multi-point touch interface 308, a pointing device 310 (e.g., a mouse). The keyboard 2008 and the pointing device 310 may be coupled to the visual display device 318. The computing device 300 may include other suitable conventional I/O peripherals.

The computing device 300 may include one or more storage devices 324, such as a hard-drive, CD-ROM, or other computer readable media, for storing data and computer-readable instructions and/or software that implement exemplary embodiments of a location tracking system 2032 as taught herein. Exemplary storage device 324 may also store one or more databases for storing any suitable information required to implement exemplary embodiments. The databases may be updated by a user or automatically at any suitable time to add, delete or update one or more items in the databases.

Exemplary storage device 324 may store one or more system databases 326 for storing information on RFID data association. System database 326 may also include information on each RFID data read including, but not limited to, properties of the item, the type of geographical location at which the load is located, the RFID reader and RFID reader antenna receiving the tag information, the quantity of RFID tags, the mix of the RFID tags, and the like.

Exemplary storage device 324 may store one or more system analysis databases 328 for storing information on RFID data association that may be used in determining if the criteria for group formation were satisfied and the like. System analysis database 328 may also include information on each system analysis method including, but not limited to, the location of the RFID data, the status of the RFID data, the type of the RFID data, and the like.

Exemplary storage device 324 may store one or more group formation databases 330 for storing any group designation criteria. Group formation database 330 may also include additional information including, but not limited to, the facility distribution of RFID readers throughout the area, tag information, product location information and the like.

The computing device 300 may include a network interface 312 configured to interface via one or more network devices 322 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 312 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 316, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 316 may be run in native mode or emulated mode. In an exemplary embodiment, the operating system 316 may be run on one or more cloud machine instances.

FIG. 4 is a block diagram of an exemplary network environment 400 suitable for a distributed implementation of exemplary embodiments. The network environment 400 may include one or more servers 402 and 404 coupled to one or more RFID readers 406 and 408 via a communication network 410. The servers 402 and 404 may take the form of or include one or more computing devices 400' and 400'', respectively. Similarly, the RFID readers 406 and 408 may take the form of or include one or more computing devices 400''' and 400'''', respectively, that are similar to the computing device 1000 illustrated in FIG. 1.

The network interface 312 and the network device 322 of the computing device 400 enable the servers 402 and 404 to communicate with the RFID readers 406 and 408 via the communication network 410. As described with respect to FIG. 1, each RFID reader, such as RFID readers 406 and 408, may read RFID tags and produce RFID data including tag information from the RFID tags it reads. The communication network 410 may include, but is not limited to, the Internet, an intranet, a LAN (Local Area Network), a WAN (Wide Area Network), a MAN (Metropolitan Area Network), a wireless network, an optical network, and the like. The communication facilities provided by the communication network 410 are capable of supporting distributed implementations of exemplary embodiments.

In an exemplary embodiment, the servers 402 and 404 may provide the RFID readers 406 and 408 with computer-readable and/or computer-executable components or products under a particular condition, such as a license agreement. The computer-readable and/or computer-executable components or products may include those for providing and rendering an exemplary RFID reader interface. The RFID readers 406 and 408 may provide and render an exemplary RFID data using the computer-readable and/or computer-executable components and products provided by the servers 402 and 404. In an exemplary embodiment, the RFID reader 406 and 408 may transmit RFID data including RFID tag information defined by the user using the user interface to the servers 402 and 404 that may, in turn, automatically determine if unique RFID tags have satisfied the criteria to form a group.

Alternatively, in another exemplary embodiment, the RFID readers 406 and 408 may provide the servers 402 and 404 with computer-readable and computer-executable components or products under a particular condition, such as a license agreement. The computer-readable and computer-executable components or products may include those for providing exemplary RFID reader self-discovery information. For example, in an exemplary embodiment, the servers 402 and 404 may transmit RFID data association based on tag information using the computer-readable and/or computer-executable components and products provided by the RFID readers 406 and 408. In an exemplary embodiment, the servers 402 and 404 may transmit information on a RFID reader self-discovery operation defined by the user using the user interface to the RFID readers 406 and 408 that may, in turn, automatically execute the RFID reader data association operation.

Figure 5:
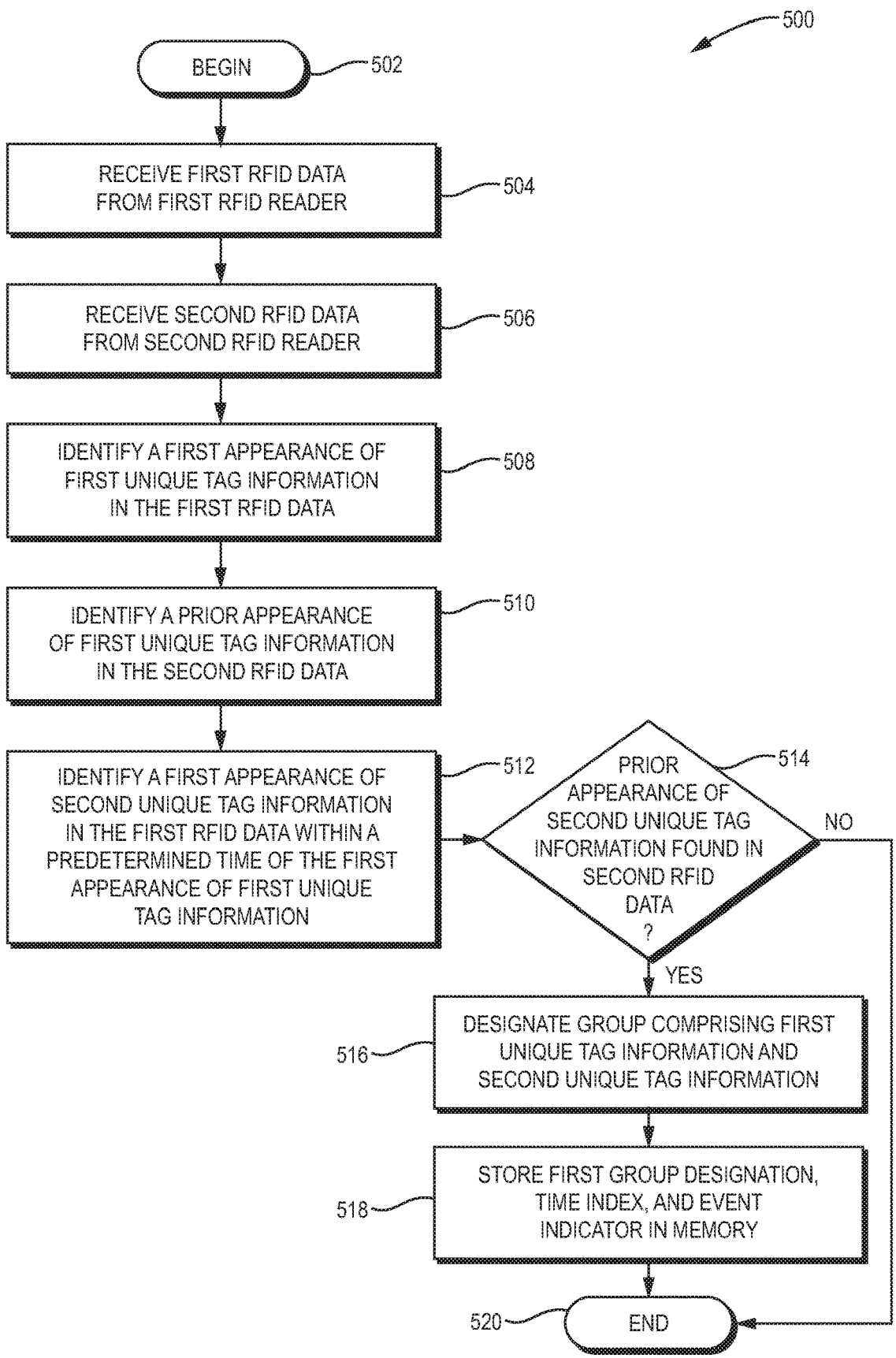
FIG. 5 is a flow chart of an exemplary method for monitoring a group merchandise event via wireless tracking in accordance with exemplary embodiments.

FIG. 5 is a flow diagram of an exemplary process 500 for monitoring a group merchandise event via wireless tracking. Process 500 may be implemented, for example, in network environment 400. Process 500 begins at block 502. At block 504, first RFID data is received from a first RFID reader, such as RFID reader 210 of FIG. 1. At block 506, the second RFID data is received from a second RFID reader, such as RFID reader 260 of FIG. 1. Although process 500 illustrates block 504 before block 506 in the flow, RFID data may be received from the second RFID reader before RFID data is received from the first RFID reader. Similarly, RFID data may be received from the second RFID reader at approximately the same time that RFID data is received from the first RFID reader. RFID data from the first RFID reader and/or the second RFID reader may be received intermittently or continuously. RFID data may include time information that indicates when any tag information was read by the antenna of the associated RFID reader. The first RFID data associates tag information of an RFID tag with each antenna of the first RFID reader that reads the tag information. For example, RFID data from RFID reader 210 would associate antenna 212 with any tag information read by that antenna. The second RFID data associates tag information of an RFID tag with each antenna of the second RFID reader that reads the tag information. For example, RFID data from RFID reader 260 would associate antenna 262 with any tag information read by that antenna.

At block 508, a processor identifies a first appearance of first unique tag information in the first RFID data. At block 510, the processor identifies an appearance of the first unique tag information in the second RFID data prior to the first appearance of the first unique tag information in the first RFID data. For example, a processor 302 may compare the first RFID data with the second RFID data to determine whether both the first RFID data with the second RFID data at one time included the first unique tag information. Processor 302 may compare the first RFID data with the second RFID data, upon command, whenever it receives the data, intermittently, and/or continuously. If the second RFID data does not include the first unique tag information, processor 302 may compare the first RFID data with other available RFID data to determine whether both the first RFID data with the other available RFID data at one time included the first unique tag information. Processor 302 may continue comparing the first RFID data until it finds other available RFID data that at one time included the first unique tag information.

The processer 302 may only check for a prior appearance of first unique tag information in the other RFID data for a specified period of time. For example, the prior appearance of first unique tag information may be required to occur in the other RFID data within 1, 2, 5, 10, 15, 20, 30, or 45 seconds before its first appearance in the first RFID data. Still alternatively, the prior appearance of the first unique tag information may be required to occur in the other RFID data within 50, 100, 200, 250, 300, 400, or 500 microseconds before its first appearance in the first RFID data.

At block 512, the processer 302 identifies a first appearance of second unique tag information in the first RFID data. The first appearance of a second unique tag information must appear within a specified period of time of the first appearance of the first unique tag information in the first RFID data in order for the processer to continue checking whether a group should be designated. For example, the first and second unique tag information may be required to first appear within the first RFID data within 30 seconds. Alternatively, the first and second unique tag information may be required to first appear within the first RFID data within 1, 2, 5, 10, 15, 20 or 45 seconds. Still alternatively, the first and second unique tag information may be required to first appear within the first RFID data within 50, 100, 200, 250, 300, 400, or 500 microseconds.

At block 514, the processor 302 checks for a prior appearance of the second unique tag information in the RFID data that previously included the first unique tag information. In particular, the processor 302 may check for an appearance of the second unique tag information in the second RFID data prior to the first appearance of the second unique tag information in the first RFID data. Optionally, the processer 302 may only check for a prior appearance of the second unique tag information in the second RFID data within a specified amount of time before the first appearance of the second unique tag information in the first RFID data. For example, the prior appearance of second unique tag information may be required to occur in the second RFID data within 1, 2, 5, 10, 15, 20, 30, or 45 seconds before its first appearance in the first RFID data. Still alternatively, the appearance of the second unique tag information may be required to occur in the second RFID data within 50, 100, 200, 250, 300, 400, or 500 microseconds before its first appearance in the first RFID data. Alternatively, the processer 302 may check for a prior appearance of the second unique tag information in the second RFID data for an unlimited amount of time before the first appearance of the second unique tag information in the first RFID data. If no such prior appearance of the second unique is found, the processor proceeds to block 520 and stops checking whether to designate a new group.

Alternatively, if the prior appearance of the second unique tag information in the second RFID data is found at block 514, the processor 302 proceeds to step 516 and designates a first group comprising the first unique tag information and the second unique tag information. At block 518, the first group designation may be stored in memory along with a time index and an event indicator that indicates a group formation. If processor 302 determines that the first RFID data and the second RFID data include a first appearance of a first unique tag information in the first RFID data and the second RFID data and determine an a first appearance of the second unique tag information in the second RFID data prior to the appearance of the second unique tag information in the first RFID data, it may then determine a first event indicator a first group designation and a first time index are stored in memory 306 indicating a group formation. Alternatively, processor 302 may only compare the first RFID data with the second RFID data to determine whether both the first RFID data with the second RFID data include any of the same unique tag information within a certain time range.

RFID data may be generated intermittently or continuously. RFID data associations can be performed at predetermined time increments and durations. The predetermined time increments may be fixed time periods or variable time periods. They may occur as frequently as every five microseconds. The RFID tags may be applied to fixtures, pallets, cases or items. RFID data associations can be compared over a period of time to monitor store facility changes or remerchandising a section of the facility.

Unique tag information from an RFID tag may appear in the RFID data of multiple RFID readers. Unique tag information from an RFID tag may further appear in the RFID data associated with multiple antennas of any RFID reader. For example, unique tag information may appear in the first RFID data and in the second RFID data. Alternatively, unique tag information may appear in the first RFID data associated with multiple antennas. Accordingly, in block 4008, any antenna associations in the RFID data may be used to determine the first group designation, a first time index and a first event indicator. Based on the association in the RFID data, a determination of the first group designation is made. Processor 302 may immediately analyze the RFID data comparison. If not, processor 302 may store the comparison in the RFID system database 326. Processor 302 continues the analysis by comparing RFID data. Processor 302 makes a determination of a first group designation based on the appearance of the same unique tag information in the RFID data. Processor 302 may create associations based on the commonality of the RFID data assigned to the RFID reader. Processor 302 may store the analysis in the systems analysis database 328.

Additionally, processor 302 may utilize preexisting information stored in the RFID association database to generate the group formation. Preexisting information may include, past RFID data including, past group formation information and past reading intervals, additional RFID tag information including, location information, location history, product information, stocking location information, and merchandising information. The process 500 then ends at block 520.

Figure 6:
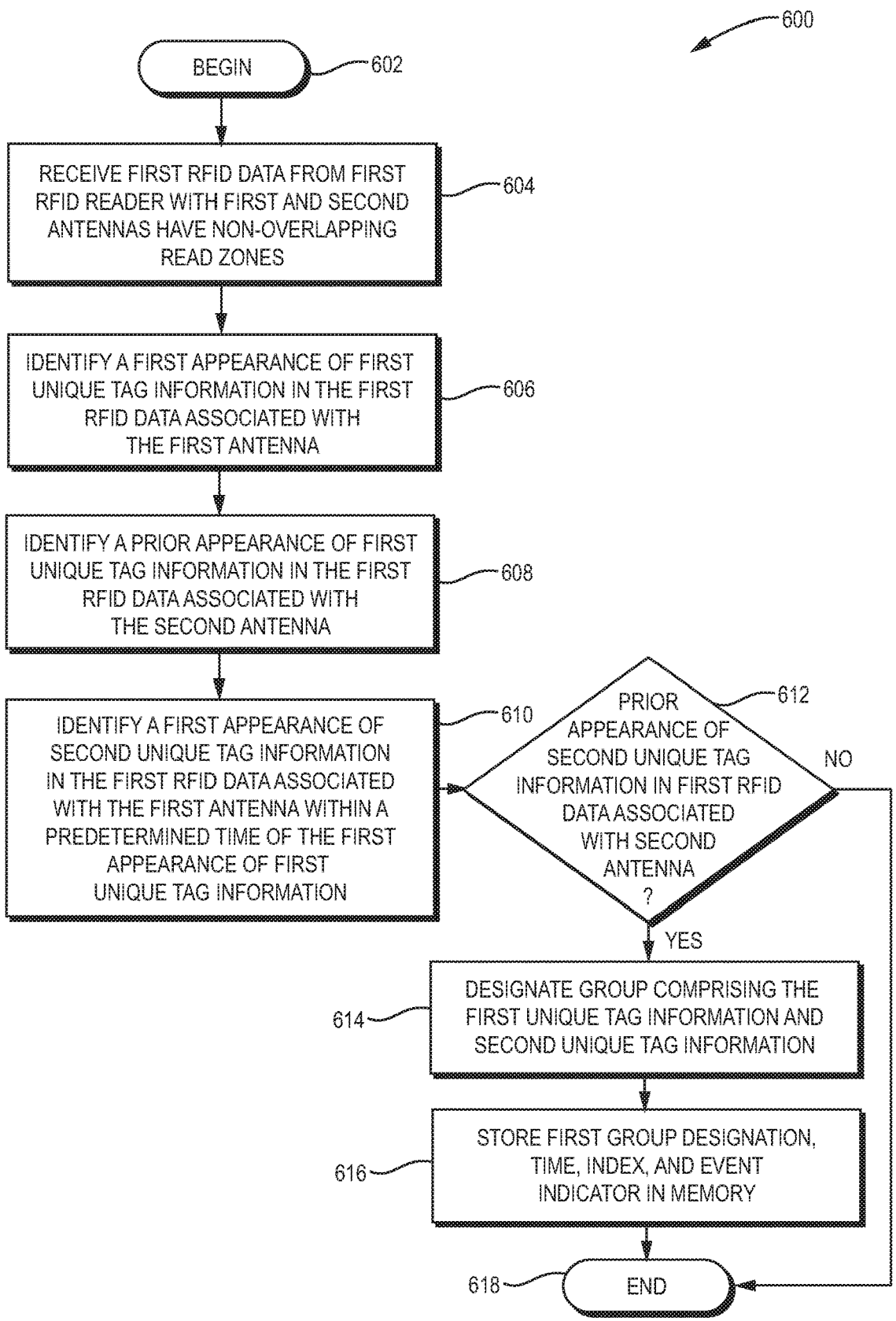
FIG. 6 is a flow chart of an exemplary method for monitoring a group merchandise event via wireless tracking in accordance with exemplary embodiments.

FIG. 6 is a flow diagram of an exemplary process 600 for forming a group according to one embodiment. Process 600 may be implemented, for example, in network environment 410. Process 600 begins at block 602. At block 604, first RFID data is received. The first RFID data is generated by a first RFID reader comprising at least two antennas having non-overlapping read zones. The first RFID data associates tag information of an RFID tag with each antenna of the first RFID reader that read the tag information. At block 606, the processor identifies a first appearance of the first unique tag information in the first RFID data associated with a first antenna. At block 608, the processor identifies an appearance of the first unique tag information in the first RFID data associated with a second antenna prior to the first appearance of the first unique tag information in the first RFID data associated with the first antenna. At block 610, the processor identifies a first appearance of second unique tag information in the first RFID data associated with the first antenna within a predetermined time before the first appearance of the first unique tag information in the first RFID data associated with the first antenna.

At block 612, the processor checks for a prior appearance of the second unique tag information in the first RFID data associated with the second antenna. In particular, the processor 302 may check for an appearance of the second unique tag information in the first RFID data associated with the second antenna prior to the first appearance of the second unique tag information in the first RFID data associated with the first antenna. Optionally, the processer 302 may only check for a prior appearance of the second unique tag information in the first RFID data associated with the second antenna within a specified amount of time before the first appearance of the second unique tag information in the first RFID data associated with the first antenna. For example, the prior appearance of second unique tag information may be required to occur in the RFID data within 1, 2, 5, 10, 15, 20, 30, or 45 seconds before its first appearance in the first RFID data associated with the first antenna. Still alternatively, the appearance of the second unique tag information may be required to occur in the first RFID data within 50, 100, 200, 250, 300, 400, or 500 microseconds before its first appearance in the first RFID data associated with the first antenna. Alternatively, the processer 302 may check for a prior appearance of the second unique tag information in the first RFID data associated with the second antenna for an unlimited amount of time before the first appearance of the second unique tag information in the first RFID data associated with the first antenna. If no such prior appearance of the second unique tag information in the RFID data associated with the second antenna is found, the processor proceeds to block 618 and stops checking whether to designate a new group.

Alternatively, if the prior appearance of the second unique tag information in the first RFID data associated with the second antenna is found at block 612, the processor 302 proceeds to step 614 and designates a first group comprising the first unique tag information and the second unique tag information. At block 616, the first group designation may be stored in memory, such as memory 306. Additionally, a first time index and a first event indicator indicating a group formation may be stored in memory, in association with the first group designation. The process ends at block 618.

Group designations may be used to provide a better understanding of item movement within a facility. Group designations may provide information allowing improvements in maintaining inventory levels and stocking efficiency. Merchandising teams may use the group designations to understanding facility traffic flow patterns, for example, what areas of the facility receive higher or lower traffic volumes, variable traffic patterns during different times of day, or variable patterns during different times of the year. The group designations may be used to plan facility layouts by providing understand what shoppers typically purchase together, and the order in which the items are purchased.

Group designations may also be used to interface with inventory management systems. For example, one inventory management system may trigger an employee restocking action or a reordering action. The group designation data may also provide information about what items are not purchased together, and may interface with a distribution system to avoid a potential overstock in a specific facility.

Group designations may also be used with inventory control, store security, and loss prevention systems. The group designation may provide an understanding of what group designations are typically a potential loss target. A facility may be able to use this information to provided additional resources to a specific area of a store, where the losses are more likely to originate. Additionally, group tracking information may provide real time information to a facility security system. For example, when a group of items begins to move together the group designation may trigger an alarm alerting the security team that a suspect group of items has formed and is moving in a certain direction. A suspect group of items may consist of a large number of the same item or an abnormal amount of the same high value item. Additionally, the group designations may provide useful information if a group of items is moving towards an exit and has failed to pass through a required RFID check point such as a point of sale.

The group designation may be terminated by a variety of different events. A group designation may be terminated if the group fails to move for a predetermined amount of time. A group designation may be terminated if one RFID tag in the group moves and appears with in a non-overlapping RFID data but the another RFID tag does not. Termination of a group designation may also occur when RFID tags in the group are separated and each appear within RFID data that does not contain the previously associated RFID tags.

What is claimed is:

1. A system for determining item movement via wireless tracking comprising:
    a plurality of RFID read zones in a facility;
    a first RFID reader located in a first zone of the plurality of RFID read zones;
    a second RFID reader located in a different non-overlapping zone of the plurality of RFID read zones from the first RFID reader;
    a processing device communicatively coupled to the first RFID reader and the second RFID reader configured to:
        receive first RFID data by the first RFID reader;
        receive second RFID data by the second RFID reader, the second RFID data different than the first RFID data;
        identify a first appearance of a first unique tag information in the first RFID data;

identify a second appearance of the first unique tag information in the second RFID data;
identify a first appearance of a second unique tag information in the second RFID data;
determine whether the second unique tag information appears in the first RFID data within a first period of time prior to the first appearance of the second unique tag information in the second RFID data;
designate, responsive to the second unique tag information appearing in the first RFID data within the first time period prior to the first appearance of the second unique tag information in the second RFID data, a group comprising the first unique tag information and the second unique tag information;
store in a memory a group designation including the first unique tag information the second unique tag information, a time corresponding to when the group is designated, and a first event indicator indicating formation of the group;
detect, during a second period of time, the first unique tag information in third RFID data, the third RFID data different than the first and second RFID data;
detect, during the second period of time, an absence of the second unique tag information in third RFID data; and
update, in the memory, the group designation including a time corresponding to the second period of time and a second event indicator indicating termination of the group.

2. The system of claim 1, wherein the processing device further configured to:
trigger an alert based on the second event indicator.

3. The system of claim 2, wherein the alert comprising a system notification, a message directed towards a specific user, a message sent via visual or audio alters throughout the facility.

4. The system of claim 1, wherein the processing device further configured to:
filter the first RFID data to eliminate shadow data, wherein the shadow data includes duplicate RFID tag reads and ambiguous RFID tag reads due to signal interruptions.

5. The system of claim 1, wherein the processing device further configured to:
analyze the second event indicator to identify a traffic flow pattern within the facility.

6. The system of claim 1, wherein the processing device further configured to:
calculate a confidence score based on a comparison of the first unique tag information and the second unique tag information in the first RFID data and the second RFID data.

7. A method for determining item movement via wireless tracking comprising:
receiving, from a first RFID reader located in a first zone of a plurality of RFID read zones in a facility, first RFID data;
receiving, from a second RFID reader located in a different non-overlapping zone of the plurality of RFID read zones from the first RFID reader, second RFID data, wherein the second RFID data is different than the first RFID data;
identifying, by a processing device, a first appearance of a first unique tag information in the first RFID data;
identifying, by a processing device, a second appearance of the first unique tag information in the second RFID data;
identifying, by a processing device, a first appearance of a second unique tag information in the second RFID data;
determining, by a processing device, whether the second unique tag information appears in the first RFID data within a specified time prior to the first appearance of the second unique tag information in the second RFID data;
designating, by a processing device responsive to the second unique tag information appearing in the first RFID data within the first time period prior to the first appearance of the second unique tag information in the second RFID data, a group comprising the first unique tag information and the second unique tag information;
storing, by a processing device, in a memory, a group designation including the first unique tag information, the second unique tag information, a time corresponding to when the group is designated, and a first event indicator indicating formation of the group;
detecting, by a processing device, during a second period of time, the first unique tag information in a third RFID data, the third RFID data different than the first and second RFID data;
detecting, by a processing device, during the second period of time, an absence of the second unique tag information in third RFID data; and
updating, by a processing device, in the memory the group designation including a time corresponding to the second period of time and a second event indicator indicating termination of the group.

8. The method of claim 7, further comprising:
triggering an alert based on the second event indicator.

9. The method of claim 8, wherein the alert comprises a system notification, a message directed towards a specific user, a message sent via visual or audio alters throughout the facility.

10. The method of claim 7, further comprising:
filtering the first RFID data to eliminate shadow data, wherein the shadow data includes duplicate RFID tag reads and ambiguous RFID tag reads due to signal interruptions.

11. The method of claim 7, further comprising:
analyzing the second event indicator to identify a traffic flow pattern within the facility.

12. The method of claim 7, further comprising:
calculating a confidence score based on a comparison of the first unique tag information and the second unique tag information in the first RFID data and the second RFID data.

13. A non-transitory computer readable medium, having stored thereon, instructions that when executed by a computing device, cause the computing device to perform operations comprising:
receiving, from a first RFID reader located in a first zone of a plurality of RFID read zones in a facility, a first RFID data;
receiving, from a second RFID reader located in a different non-overlapping zone of the plurality of RFID read zones from the first RFID reader, a second RFID data, wherein the second RFID data is different than the first RFID data;
identifying, by a processing device, a first appearance of a first unique tag information in the first RFID data;
identifying, by a processing device, a second appearance of the first unique tag information in the second RFID data;

identifying, by a processing device, a first appearance of a second unique tag information in the second RFID data;

determining, by a processing device, whether the second unique tag information appears in the first RFID data within a first time period prior to the first appearance of the second unique tag information in the second RFID data;

designating, by a processing device responsive to the second unique tag information appearing in the first RFID data within the first time period prior to the first appearance of the second unique tag information in the second RFID data, a group comprising the first unique tag information and the second unique tag information;

storing, by a processing device, in a memory a group designation including the first unique tag information, the second unique tag information, a time corresponding to when the group is designated, and a first event indicator indicating formation of the group;

detecting, by a processing device, during a second period of time, the first unique tag information in a third RFID data, the third RFID data different than the first and second RFID data;

detecting, by a processing device, during the second period of time, an absence of the second unique tag information in third RFID data; and updating, by a processing device, in the memory, the group designation including a time corresponding to the second period of time and a second event indicator indicating termination of the group.

14. The computer readable medium of claim 13, wherein the operations performed by the computer device further comprise:

triggering an alert based on the second event indicator.

15. The computer readable medium of claim 14, the alert comprising a system notification, a message directed towards a specific user, a message sent via visual or audio alters throughout the facility.

16. The computer readable medium of claim 13, wherein the operations performed by the computer device further comprise:

filtering the first RFID data to eliminate shadow data, wherein the shadow data includes duplicate RFID tag reads and ambiguous RFID tag reads due to signal interruptions.

17. The computer readable medium of claim 13, wherein the operations performed by the computer device further comprise:

analyzing the second event indicator to identify a traffic flow pattern within the facility.

18. The computer readable medium of claim 13, wherein the operations performed by the computer device further comprises:

calculating a confidence score based on a comparison of the first unique tag information and the second unique tag information in the first RFID data and the second RFID data.

* * * * *